United States Patent [19]
Newbolt et al.

[11] Patent Number: 5,813,801
[45] Date of Patent: Sep. 29, 1998

[54] DENSE PHASE PARTICULATE CONVEYING SYSTEM AND METHOD WITH CONTINUOUS AIR LEAKAGE MANAGEMENT

[75] Inventors: Richard E. Newbolt, Sabetha, Kans.; Ross McEllhiney, Parkville, Mo.

[73] Assignee: Mac Equipment, Inc., Sabetha, Kans.

[21] Appl. No.: 673,357

[22] Filed: Jun. 28, 1996

[51] Int. Cl.$^6$ .................................................. B65G 53/66
[52] U.S. Cl. ................................. 406/14; 406/63; 406/65
[58] Field of Search ................................. 406/14, 63, 64, 406/65, 66, 67; 137/486; 251/122

[56] References Cited

U.S. PATENT DOCUMENTS

| | | | |
|---|---|---|---|
| 2,061,852 | 11/1936 | Schweitzer | 251/122 |
| 4,134,423 | 1/1979 | Mayer | 137/486 |
| 4,417,312 | 11/1983 | Cronin et al. | 364/510 |
| 4,420,279 | 12/1983 | Easley, Jr. | 406/14 |
| 4,515,503 | 5/1985 | Snowdon | 406/11 |
| 4,715,748 | 12/1987 | Krambrock | 406/11 |
| 4,775,267 | 10/1988 | Yamamoto | 406/50 |
| 4,777,383 | 10/1988 | Waller et al. | 307/110 |
| 4,834,587 | 5/1989 | Crawley et al. | 406/23 |
| 5,083,744 | 1/1992 | Reinicke et al. | 251/129.11 |
| 5,190,068 | 3/1993 | Philbin | 137/8 |
| 5,265,983 | 11/1993 | Wennerstrom et al. | 406/24 |
| 5,397,062 | 3/1995 | Krambrock | 239/590 |
| 5,407,305 | 4/1995 | Wallace | 406/14 |

FOREIGN PATENT DOCUMENTS 2-182621   7/1990   Japan.

OTHER PUBLICATIONS

Allied Industries brochure entitled "Flo–Tronics, The Flo–Wave Story", Truly Flexible Dense Phase Conveying, Revised May 8, 1991.

Allied Industries brochure entitled "Flo–tronics, Tapered Rotary Airlock", Rotary Airlock Feeders, Revised May 28, 1991.

*Primary Examiner*—Andrew C. Pike
*Attorney, Agent, or Firm*—Shook, Hardy & Bacon L.L.P.

[57] ABSTRACT

A continuous dense phase conveying system and method regulates and modulates the volume of gas flowing at a low velocity within a material conveying pipe. In response to air volume leakage through a rotary airlock valve, a controller adjusts a flow control valve to maintain the volume of air for conveying at a selected level. The flow control valve has a venturi-shaped output section. The flow control valve is more than 90% efficient (e.g., less than 10% pressure drop across the valve) and has an output that varies linearly, over a wide range, with adjustment of the valve.

17 Claims, 2 Drawing Sheets

DENSE PHASE PARTICULATE CONVEYING SYSTEM AND METHOD WITH CONTINUOUS AIR LEAKAGE MANAGEMENT

BACKGROUND OF THE INVENTION

1. Field of the Invention

The present invention relates in general to a pneumatic conveying apparatus and method for pneumatically conveying particulates. In particular, the present invention relates to an improved dense phase conveying method and apparatus.

2. Description of the Related Art

Pneumatic conveying systems are designed to move large quantities of particulate material in an air, or inert gas, medium through a material conveying pipe. The use of the term "particulate material" herein includes any material which is in a granular, powder, or pelletized form including, but not limited to, pellets formed of plastic material or other chemicals, bulk commodity grains and feed material, soap powders, and other similar bulk materials, as are known in the art. Typically, the type of particulate material to be conveyed determines what type of pneumatic conveying system to utilize.

If the particulate material to be conveyed is either abrasive or subject to product degradation, dense phase conveying systems have been previously utilized. Dense phase conveying systems are characterized by utilizing relatively low air, or inert gas, velocities and a relatively high conveying pressure (as compared to dilute phase conveying systems). The conveying pressure in dense phase systems may be as high as 60 psig or higher, and the air, or inert gas, streams travel at a velocity typically not exceeding approximately 3,000 feet per minute.

With dense phase conveying systems, the particulate material is pushed, or extruded, through the material conveying pipe in dunes, balls, or "slugs". Since the air, or inert gas, velocity is low, the solid particulate material is not suspended in the air stream, but falls in the form of strands to the bottom of the material conveying pipe. The strands are moved through the material conveying pipe by the force exerted upon them by the flowing air, or inert gas, stream, as is well known in the art. When enough particulate material is fed into the material conveying pipe, the dunes and balls formed are moved ahead until the dunes or balls hit each other and form solid plugs, or slugs of particulate material. Since the air, or inert gas, cannot pass through the formed plug, the gas pressure behind the plug pushes, or extrudes, the plug down the material conveying pipe while the next plug, or slug, is being formed. The slugs will be of varying length, depending upon the nature of the particulate product being conveyed, and will typically follow each other along the material conveying pipe with a space between successive slugs of particulate material.

In the past, a known type of prior art dense phase conveying system has utilized a high pressure rotary airlock valve to feed the particulate material into the material conveying pipe, such that the dense phase conveying system could be operated in a continuous mode. Such systems utilize one or more air control valves and pressure regulators to control the volume of air and the air pressure within the material conveying pipe during particulate conveyance.

There are a variety of problems associated with the use of conventional dense phase conveying systems having a rotary airlock valve. One such problem is that, although rotary airlock valves are highly efficient devices, they nevertheless experience some leakage of air. This air leakage reduces the volume of air utilized to convey particulate down the conveying pipe, thus resulting in an undesirable excessive pressure increase in the conveying pipe. The reduction in air volume resulting from the leakage through the rotary airlock valve, and the resulting increased air pressure in the conveying pipe adversely affect the conveying operation. For instance, one immediate problem resulting from the loss in air volume and increase in air pressure is the loss of conveying speed. This loss in speed can cause overplugging in the conveying pipe, thereby significantly hindering, and perhaps completely disrupting, the conveying process.

Additionally, past dense phase particulate conveying systems utilizing rotary airlock valves have involved complicated machinery, and have thus been space-consuming and expensive to manufacture and maintain. Air control valves, for controlling the volume of air flowing in a pipe in which material is conveyed, are located upstream from the pipe in such systems and are typically either a fixed valve or a variable valve.

One advantage of utilizing a fixed valve nozzle, as they are known, for controlling air volume in a conveying system is that fixed nozzles are typically highly efficient. In this regard, efficiency of the valve is a measure of the gas pressure differential across the valve. In the past, it has been possible to utilize fixed valves where the air pressure on the downstream side of the valve is within 90% (or slightly greater) of the air pressure on the upstream side of the valve. However, a primary disadvantage with fixed valves is their inflexibility. For instance, where multiple possible conveying destinations are present, it would be necessary, with the use of fixed valves, to substitute one valve nozzle for another to accommodate a change in conveying distance or destination.

To overcome the shortcomings of fixed valves, variable valves are often used. Such valves have an orifice that can be opened and closed to vary the volume of air passing the valve. Such variable valves offer increased flexibility in controlling the conveying of particulate material. However, prior variable valves are highly inefficient when compared with the efficiency of a fixed valve. For instance, the air pressure on the downstream side of a conventional variable valve is typically only within approximately 50–60% of the air pressure on the upstream side of the valve. Thus, in order to obtain a certain desired air volume on the downstream side of the valve, use of conventional variable valves requires a significantly greater pressure at the upstream side of the valve. Therefore, where conventional variable valves are used in a conveying system, the system requires a great deal of air compression, and hence energy consumption.

In addition to the foregoing drawbacks of dense phase conveying systems utilizing rotary airlock valves, and specifically those systems having a variable air control valve, the variable control valves used in past dense phase conveying systems have not been constructed to provide an output that is linearly proportional to the adjustment of the valve over a wide range. Thus, where a single variable valve is used in a system having the ability to convey particulate to one of multiple possible destinations, a great deal of calculations must be performed, and an increased number of components utilized, in order to change conveyance from one destination to another. Moreover, the inability of conventional variable valves to afford an output that varies linearly with adjustment of the valve makes use of the valve difficult and inefficient for making continuous adjustments to the air flow in a dense phase conveying system.

Accordingly, the need exists for a dense phase conveying system for conveying particulate material which is simple, efficient, and economical to manufacture and use; does not require an excessive amount of space for the necessary equipment; prevents undesired overplugging of the material conveying pipe and resulting undesired pressure increases; maintains conveying speed at substantially a constant rate; is easily adjustable to compensate for varying losses of air volume in the conveying pipe caused by leakage; is easily adjustable to permit particulate conveyance to one of multiple possible destinations; includes a highly efficient variable valve; and includes a valve having an output that varies linearly with adjustment of the valve.

The present invention overcomes the drawbacks of the prior art and fills the foregoing and other needs.

SUMMARY OF THE INVENTION

An object of the present invention is to convey particulate materials in a simple, efficient, and economical manner.

Another object of the present invention is to reduce the number of components in a dense phase particulate conveying system.

Another object of the present invention is to prevent undesirable overplugging in a material conveying pipe and resulting undesirable pressure increases.

Another object of the present invention is to maintain conveying speed in a dense phase particulate conveying system at a substantially constant speed.

Another object of the present invention is to easily and continuously compensate for air volume losses resulting from leakages in a dense phase particulate conveying system.

Another object of the present invention is to easily adjust a dense phase particulate conveying system to convey to a different destination.

Another object of the present invention is to reduce energy consumption in a dense phase particulate conveying system by utilization of a highly efficient valve.

Still another object of the present invention is to provide a control system for a dense phase particulate conveying system having a valve output that varies linearly with adjustment of the valve.

These and other objects are achieved by a dense phase particulate conveying system and method having a unique air flow management system. The conveying apparatus of the present invention has a material conveying pipe in which particulate material is conveyed. Particulate material is introduced into a first end of the pipe, from a material storage bin, through a rotary airlock valve. The particulate is conveyed down the pipe to a second end thereof, or to a selected destination where it is output from the pipe.

The control system regulates and modulates the volume of gas flowing at a low velocity within the material conveying pipe. Specifically, the control system includes a feed pressure regulator for controlling a pressure delivered to the conveyance pipe. The pressure regulator is set to maintain a constant air pressure upstream of the flow control valve. An adjustable flow control valve, located downstream from the pressure regulator, regulates the volume of air flowing downstream into the material conveying pipe. A pressure transmitter is located downstream of the volume flow control valve to measure the pressure within the conveying pipe.

The pressure transmitter is connected to the analogue input of a PLC (logic circuit), the output of which is connected to a combined transducer\actuator. The transducer\actuator is in turn connected to the adjustable flow control valve. An operator interface, such as a keyboard and display, is located at a control panel and is connected to the logic circuit.

The adjustable air control valve used in the present invention has an air inlet portion and an air outlet portion. The outlet portion has an enlarged mouth which fairly severely tapers to a constricted (or narrow) throat portion. The throat portion opens into an elongated, nozzle section, the diameter of which tapers outwardly along the length of the section. As described, the output portion of the air (or gas) control valve of the present invention is thus venturi-shaped. A pintle, connected to the actuator, is moveable to open and close the output portion of the air control valve and, specifically, to regulate the volume of air passing through the throat portion the outlet portion of the flow control valve. Valves having such a construction are known generally, and have been used as metering devices for metering various substances such as rocket fuels and medicines, but have not heretofore been adapted for use in combination with a dense phase particulate conveying system.

In accordance with a principle aspect of the present invention, the adjustable air control valve is modulated to maintain a desired amount of air flow volume within the pipe after leakage volume has been subtracted. The control valve is modulated based upon a control algorithm $V_R=V_C+V_L$; where $V_R$ represents the required air flow volume, $V_C$ represents the conveying air flow volume, and $V_L$ represents the leakage air flow volume. The conveying volume $V_C$ represents a value which is selected by the user based upon the desired conveying to be completed and is, preferably, stored in a memory or data register associated with the logic circuit.

In operation, particulate material is introduced from the product storage bin, through the rotary airlock valve, and into a first end of the conveying pipe. Particulate slugs form in the conveying pipe, as will be readily understood. The pressure regulator is set to maintain a constant air pressure before the flow control valve in the supply line. The volume of air introduced into the conveying pipe is regulated by the air control valve. As discussed, some air volume introduced into the material conveying pipe is lost as a result of leakage. This leakage is primarily the result of a portion of the air seeping past clearances in the rotary airlock valve, as well as pocket losses. As this leakage occurs, and the volume of air flowing in the conveying pipe correspondingly reduces, the air pressure in the pipe, and particularly behind the slugs of material being formed, increases. As the air pressure increases, the air volume lost as a result of leakage increases by a proportional amount.

The pressure transmitter continuously monitors the pressure in the conveyance pipe and transmits a signal indicative of the actual pressure in the pipe to the analogue input of the logic circuit. The logic circuit performs a calculation, as described in detail below, and outputs a signal to the pressure transducer\actuator combination to adjust the air control valve an appropriate amount. Specifically, as the air pressure in the pipe increases, and thus the air volume leakage increases, the control valve is opened an appropriate amount to increase the volume of air flow into the conveying pipe to offset the amount of air volume being lost from leakage. The addition of increased air volume reduces the air pressure in the conveying pipe and, hence reduces the air leakage. This, of course, is a continuous operation with the control system of the present invention continuously monitoring the air pressure in the conveying pipe and governing the air volume introduced into the pipe to maintain system operation and particularly the conveying gas volume, at a consistent, efficient, and desired level.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
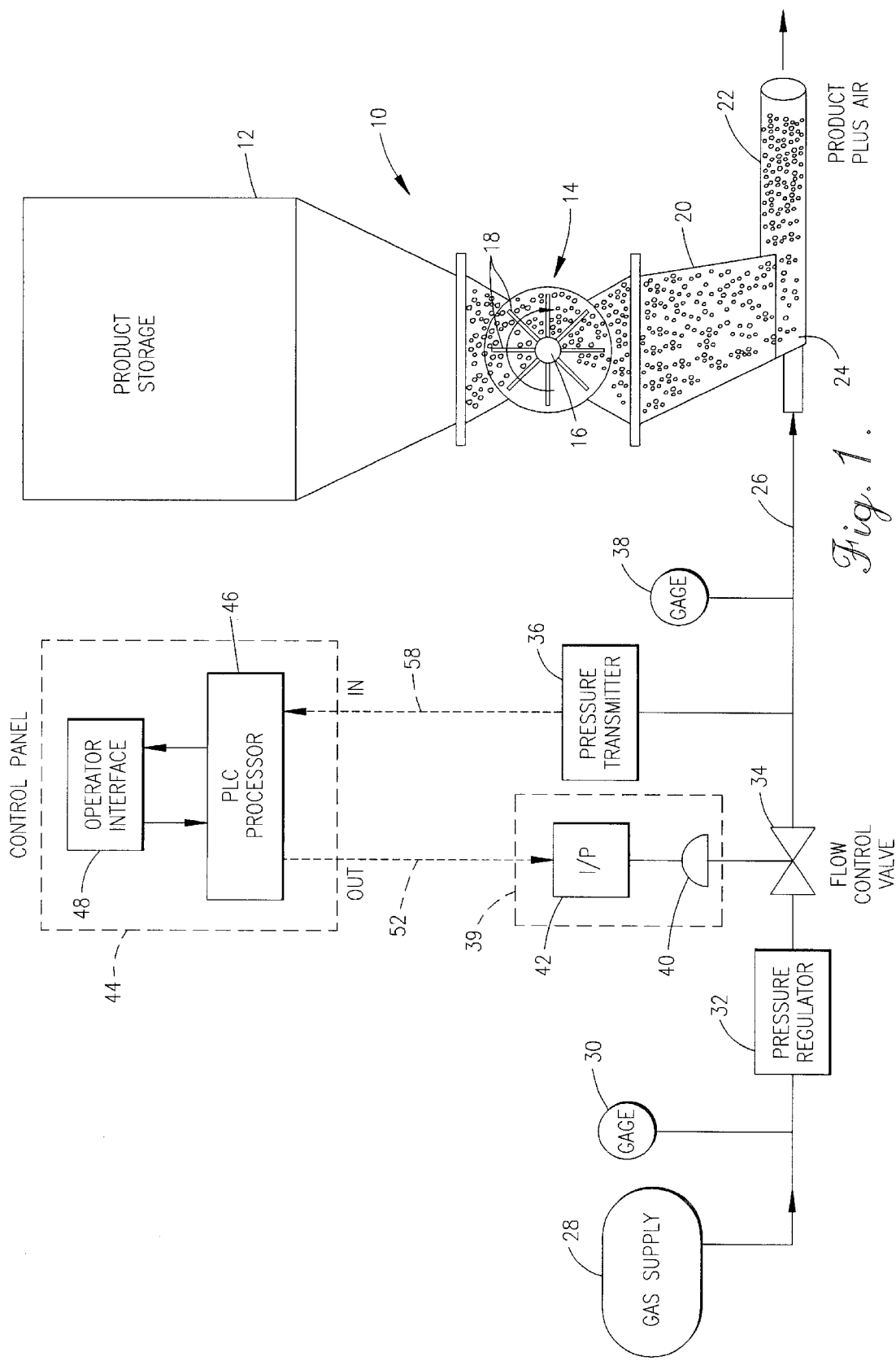
FIG. 1 is a schematic diagram of a dense phase conveying system of the present invention.

With reference initially to FIG. 1, a dense phase particulate conveying system of the present invention is denoted generally by the reference numeral 10. System 10 includes a product storage bin 12, for storing particulate, granular, or powdered product, such as feed material, pelletized plastic product, etc. The product storage bin 12 is coupled to a rotary air lock valve 14, having a central rotatable shaft 16 and a plurality of outwardly extending vane 18. The rotary air lock valve 14 is attached to, and communicates with, an upper end of a shute 20. The shute 20 is connected to, and in fluid communication with, a material conveying pipe 22. Attached to a first end 24 of material conveying pipe 22 is a gas supply line 26. An inert gas, or air, is supplied from a gas supply 28 through gas supply line 26 into material conveying pipe 22. Located in series in the gas supply line 26, between the gas supply 28 and the first end 24 of material conveying pipe 22, are a first gauge 30, a pressure regulator 32, a flow control valve 34, a pressure transmitter 36, and a second gauge 38. As shown, flow control valve 34 is coupled to a valve actuator 40, which in turn is coupled to a electrical-pneumatic (I-P) transducer 42. The actuator 40 and transducer 42 are preferably a combined unit, as indicated by reference numeral 39 and described below (as an I-P actuator).

Figures 2, 3:
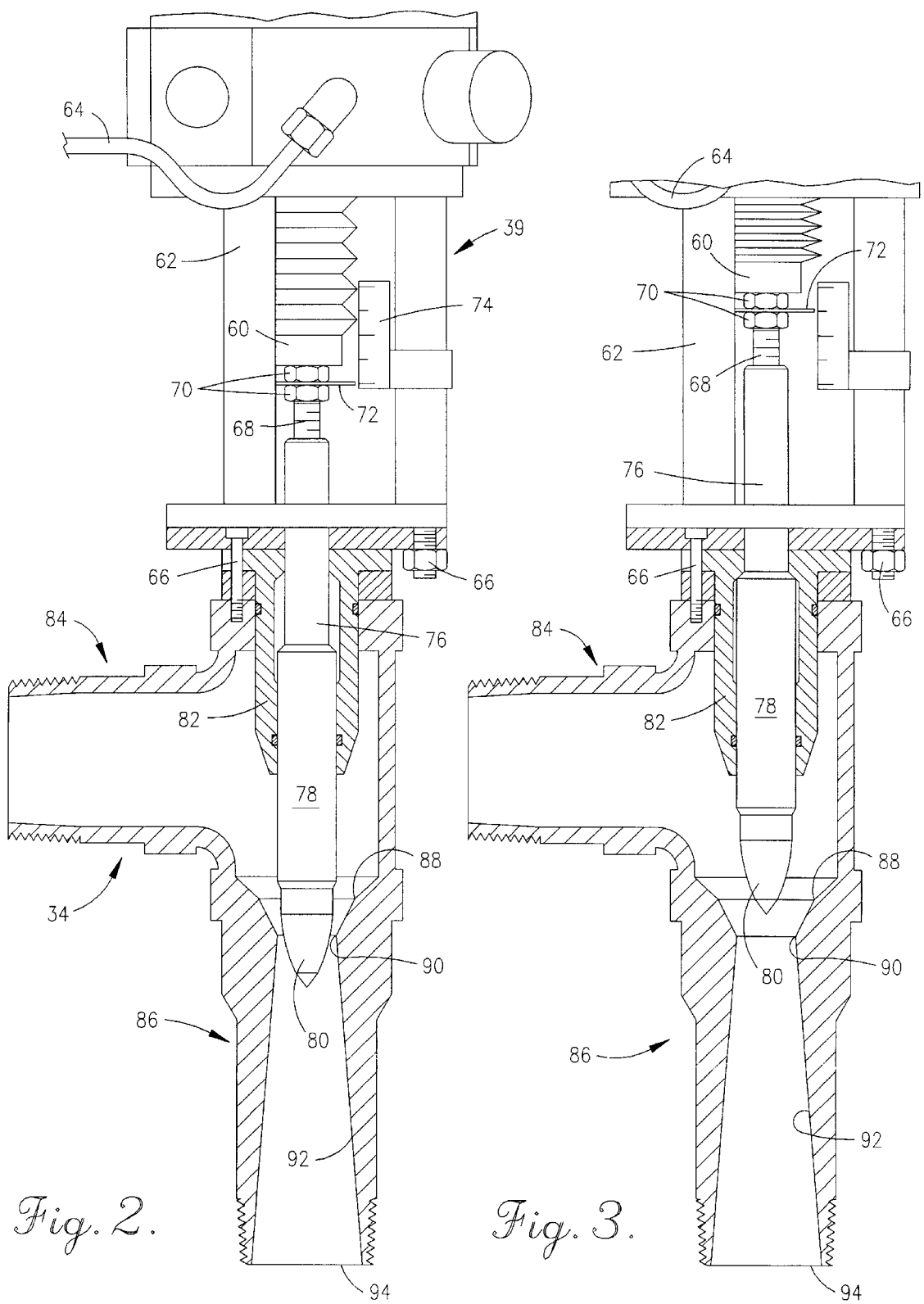
FIG. 2 is a cross-sectional views of the air control valve used in the present invention shown in a near closed position.
FIG. 3 is a cross-sectional view of the air control value of FIG. 2 shown in a open position.

A control panel 44 includes a processor 46, such as PLC processor circuitry, and a user interface 48. User interface 48 preferably includes a conventional keypad or keyboard (not shown) and a display (not shown). Processor 46, sometimes referred to herein as a controller, has an analog input port 58 coupled with the pressure transmitter 36. Processor 46 also has an analog output port 52, coupled with the electrical-pneumatic (I-P) transducer 42. With reference now to FIG. 2, the adjustable gas flow control valve 34 is shown and described in greater detail.

I-P actuator 39 includes a transducer 42 as will be readily appreciated by those skilled in the art (see FIG. 1), and as described above. Actuator 39 is a conventional actuator, such as made by Kammer under part number I-P39. Actuator 39 has an actuator stem 60 positioned within a housing 62. As will be understood, supply air is supplied to actuator 39 via a hose 64. Actuator 39 is mounted to flow control valve 34, and fastened thereto by fasteners 66. Flow control valve 34 includes a valve plug stem 68 which is threadingly engaged with actuator stem 60. Plug stem lock nuts 70 releasably engage the valve plug stem 68 with the actuator stem 60, and surround a travel indicator disc 72, which moves in relation to a measuring strip 74 to provide a visual indication of movement of the actuator stem 60 and plug system 68. Pintle 76 has a main body portion 78 terminating in a tapered, conical nose portion 80. A pintle 76 is threadingly engaged with the valve stem 68 of the actuator 39.

Flow control valve 34 includes a housing structure, including a guide sleeve 82 for receiving the pintel 76. Gas flow control valve 34 has an air inlet 84 into which supply air, for use in the particulate conveying operation, is introduced. Valve 34 also has an outlet portion, designated generally by reference numeral 86, having an enlarged mouth portion 88 which tapers inwardly to a constricted throat portion 90, before gradually tapering in an elongated outlet nozzle section 92 to the outer end 94 of the outlet portion 86 of valve 34. Thus, the outlet portion of the valve 34 is venturi-shaped.

With reference to FIG. 3, it is shown that pintle 76 is positionable within the guide sleeve 82 and in relation to the mouth and throat portions 88, 90 of the outlet 86 of the flow control valve 34. As will be readily appreciated, movement of pintle 76 is caused by actuator 39 and regulates the volume of air passing through valve 34.

Operation of the dense phase particulate conveying system 10 of the present will now be described with reference to FIGS. 1–3.

In accordance with the operating principals of the present invention, the mixture of particulate material to gas must be regulated for the system to operated reliably. The rotary air lock valve 14 regulates product flow from the bin 12 into material conveying pipe 22. The control system of the present invention, comprising all components shown in FIG. 1 other than the storage bin 12, rotary air lock valve 14, shute 20, and material conveying pipe 22, regulates the conveying gas flow, designated by $V_C$. The conveying gas flow $V_C$ is that volume of gas that actually serves to convey the particulate material through material conveying pipe 22. However, as described, the rotary air lock valve 14 has slight internal clearances between its rotor (e.g., comprised of shaft 16 and vanes 18) and the housing of the air lock valve. These clearances allow a portion of the total gas flow $V_R$ introduced into first end 24 of material conveying pipe 22 to leak. Therefore, the total gas flow must compensate for the leaking gas volume, designated by $V_L$.

Thus, the following equation defines the gas flow in the system of the present invention:

$$V_R = V_C + V_L$$

Where, $V_R$=total required gas flow volume, $V_C$=conveying gas flow volume, and $V_L$=leakage gas flow volume.

The leakage gas flow $V_L$ is a function of the conveying pressure, designated herein as $P_C$. Particularly, the leakage gas flow $V_L$ increases proportionally with an increase in conveying pressure $P_C$.

During product conveying, it is typical for the conveying pressure in material conveying pipe 22 to fluctuate. The system of the present invention constantly modulates the total required gas flow, $V_R$, to compensate for the changing leakage gas, $V_L$, thereby keeping the conveying gas flow $V_C$ constant.

It will be understood and appreciated with skill in the art that the conveying gas flow $V_C$ needed to convey particulate material depends upon a variety of variables, such as the material to be conveyed, the desired speed of conveying, the length and size of the material conveying pipe, the gas pressure to be utilized, etc.

For example, if an operator desires for the product to be conveyed at 2,000 feet/min, it will take a particular volume of conveying gas, $V_C$, to convey the product at that speed. The operator then selects a conveying volume that is believed to be appropriate for conveying the material at the selected speed, and enters it through the user interface 48 into a data register or memory associated with processor 46.

As has already been described, during operation of the conveying system 10, as the conveying pressure $P_C$ increases, a leakage volume of gas, $V_L$, leaks through the rotary air lock valve 14. Thus, the total amount of air volume required, $V_R$, must be increased to compensate for the leakage $V_L$. Specifically, as the conveying pressure $P_C$ within the material conveying pipe 22 increases, pressure transmitter 36 senses this pressure and transmits a signal indicative of the pressure to processor 46. Because the volume of leakage $V_L$ is linearly proportional to the conveying pressure $P_C$, the processor can easily determine the leakage volume $V_L$ and, hence, the required adjustment to the required flow $V_R$, to maintain the conveying volume $V_C$ at the constant level. Specifically, through prior testing of the rotary air lock valve 14, the linear relationship between volume of air leakage, $V_L$, and conveying pressure $P_C$, is known. Since the relationship is linear, a slope, m, is known and is stored in the memory or data register associated with processor 46. Thus, the equation utilized by the present invention is as follows;

$$V_R = V_C + V_L = V_C + mP_C$$

Where, $V_R$=total required gas flow volume, $V_C$=conveying gas flow volume, $V_L$=leakage gas flow volume, $P_C$=conveying pressure and m=slope.

Thus, it will be readily appreciated that, upon initial start up of the system, all that is required of the operator is to insert the desired conveying flow $V_C$ through user interface 48 into processor 46. As the conveying system operates and $P_C$ pressure fluctuates, the total required gas flow $V_R$ is modulated, by varying valve 34, in order to maintain $V_C$ at its fixed constant. The processor 46 receives from transmitter 36 the signal indicative of conveying pressure $P_C$, and adjusts flow control valve 34 to compensate for the leakage. In this regard, as the flow control valve is opened, its output varies linearly with control of the valve. As the increased volume of air flows into material conveying pipe 22, the velocity of air increases, the pressure $P_C$ within the pipe 22 begins to drop, and hence leakage volume $V_L$ begins to drop. Because the pressure transmitter 36 is continuously monitoring the conveying pressure $P_C$ within the material conveying pipe 22, this drop in pressure will immediately result in the processor adjusting the flow control valve 34, in accordance with the above-defined equation, to again slightly close flow control valve 34 to maintain the conveying flow $V_C$ at its constant selected level. Thus, the present invention continuously governs and regulates the total required gas flow, $V_R$, to maintain the actual conveying flow, $V_C$, at a constant, selected level.

As will now be readily understood, if the operator then desires or requires conveying to be at a different velocity, for instance 3500 feet/min, the operator merely enters a different selected conveying flow volume, $V_C$, through user interface 48 into the processor 46.

The linear proportionality between the leakage volume $V_L$ and the conveying pressure $P_C$, such that a defined slope m can be readily determined for a given rotary air lock valve 14, and the ability of the flow control valve 34 to have an output that varies proportionally to its adjustment, provides a highly efficient and elegant solution to conveying problems associated with the prior art.

Utilization of the adjustable gas control valve of the present invention, having a constricted throat orifice and an elongated, tapered outlet, yields numerous advantages. Firstly, based upon the realization of the present invention that the gas pressure in the conveying pipe is proportional to the volume of air being leaked, such as through the rotary air lock valve, the ability of the gas flow control valve to be linearly adjusted provides for a simple, yet highly efficient device an system. As will be readily appreciated, the utilization of a typical flow control valve having a gas volume output that does not vary linearly with the pintle stroke, would prevent the effective utilization of the linear, proportional relationship between gas leakage in the conveying pipe and gas pressure within the conveying pipe recognized by this invention.

Additionally, the construction of the gas flow control valve produces the advantageous result of a highly efficient system. In this regard, whereas prior art variable control valves had an efficiency of on the order of 50–60%, the valve utilized in accordance with the present invention has an efficiency of greater than 90%. In other words, the pressure of the gas on the downstream side of the valve is within 90% of the pressure on the upstream side of the valve. This is a highly advantageous result, because the present system therefore requires less horsepower to run a compressor. In the past, in order to obtain the required pressures of perhaps 60 psig, prior systems had to utilize a 120-psig compressor. However, through utilization of the control valve of the present invention, a smaller compressor, such as a 75-psig compressor, can be utilized, while nevertheless obtaining the needed pressure. As a result, a significant amount of energy is conserved when compared to prior art systems.

An additional advantageous result of the present invention, obtained through utilization of the adjustable gas flow control valve described herein, is that the present invention may be utilized where a wide range of conveying destinations or distances are possible. In the past, multiple fixed valve nozzles would need to be available in order to convey, on a highly efficient basis, to multiple possible conveying destinations. Use of the valve associated with the present invention prevents the use of multiple valve nozzles, while maintaining the high efficiency typically associated exclusively with a fixed valve nozzle.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A dense phase conveying system for conveying a particulate material through a material conveying pipe, said system comprising:

a rotary airlock valve for feeding the particulate material into said material conveying pipe, wherein said material conveying pipe has a pressure therein during normal operation;

a gas supply, coupled by a gas supply line to said material conveying pipe, for supplying gas into said material conveying pipe;

a pressure regulator, located in said gas supply line between said gas supply and said material conveying pipe, for regulating a pressure of the gas supplied to said material conveying pipe;

an adjustable gas flow control valve, located in said gas supply line between said pressure regulator and said material conveying pipe, for regulating a volume of the gas supplied to said material conveying pipe;

a controller having an output coupled to said adjustable gas flow control valve; and a transmitter for transmitting to said controller a signal indicative of a volume of gas supplied to said material conveying pipe that is lost as a result of leakage;

wherein said controller, upon receipt of said signal from said transmitter, controls said adjustable gas flow control valve to maintain a volume of gas, flowing in said material conveying pipe for conveying said particulate material, at a selected volume.

2. The dense phase conveying system as set forth in claim 1 wherein said transmitter comprises a pressure transmitter, located in said gas supply line between said adjustable gas flow control valve and said material conveying pipe, and coupled to said controller, for transmitting a signal indicative of said pressure in said material conveying pipe to an input of said controller;

and wherein, during operation of said system, said pressure in said material conveying pipe is proportional to said volume of gas that is lost to leakage and wherein said controller, in response to said pressure signal, determines said volume of gas that is lost to leakage and adjusts said adjustable gas flow control valve to maintain the volume of gas flowing in said material conveying pipe at the selected volume.

3. The dense phase conveying system as set forth in claim 2 wherein said adjustable gas flow control valve is opened, to thereby increase the volume of gas supplied to said material conveying pipe, in response to a rise in said pressure in said material conveying pipe resulting from formation in the conveying pipe of a slug of said material, and wherein said adjustable gas flow control device is partially closed, to thereby decrease the volume of gas supplied to said material conveying pipe, in response to a decline in said pressure in said material conveying pipe.

4. The dense phase conveying system as set forth in claim 1 wherein said adjustable flow control valve has an orifice, through which the gas supplied to said material conveying pipe flows, and an adjustable pintle for opening and closing said orifice, wherein the volume of gas flowing through said flow control valve varies in a predetermined relationship with the positioning of said pintle.

5. The dense phase conveying system as set forth in claim 1 further comprising:

an actuator coupled to said adjustable flow control valve; and a transducer connected between said actuator and said output of said controller.

6. The dense phase conveying system as set forth in claim 5 further comprising a user interface connected with said controller.

7. The dense phase conveying system as set forth in claim 6 further comprising:

a first gauge in said supply line between said gas supply and said pressure regulator; and a second gauge in said supply line between said transmitter and said material conveyance pipe.

8. A dense phase conveying system for conveying a particulate material through a material conveying pipe, said system comprising:

a rotary airlock valve for feeding the particulate material into said material conveying pipe, wherein said material conveying pipe has a pressure therein during normal operation;

a gas supply, coupled by a gas supply line to said material conveying pipe, for supplying gas into said material conveying pipe;

a pressure regulator; and an adjustable gas flow control valve, located in said gas supply line between said pressure regulator and said material conveying pipe, for regulating a volume of the gas supplied to said material conveying pipe, wherein said pressure regulator is set to maintain a pressure of the gas supplied to said adjustable gas flow control valve at a constant pressure, and wherein said adjustable gas flow control valve is adjusted, in response to a loss of gas volume in said material conveying pipe as a result of leakage, to maintain the gas volume used for conveying the particulate material in said material conveying pipe at a selected volume.

9. The dense phase conveying system as set forth in claim 8 further comprising:

a controller having an output coupled to said adjustable gas flow control valve;

a transmitter for transmitting to said controller a signal indicative of a volume of gas supplied to said material conveying pipe that is lost as a result of leakage;

wherein said controller, upon receipt of said signal from said transmitter, controls said adjustable gas flow control valve to maintain the volume of gas, flowing in said material conveying pipe for conveying said particulate material, at the selected volume.

10. A dense phase conveying system for conveying a particulate material through a material conveying pipe, said system comprising:

a rotary airlock valve for feeding the particulate material into said material conveying pipe, wherein said material conveying pipe has a pressure therein during normal operation and said valve is subject to leakage of a variable volume of gas therethrough and wherein the particulate material fed into the conveying pipe forms into a slug of the material, resulting in an increase in said pressure within said conveying pipe at a location behind said slug of material and resulting in a corresponding increase in the volume of gas leaked through said rotary airlock valve;

a gas supply, coupled by a gas supply line to said material conveying pipe, for supplying gas into said material conveying pipe;

a pressure regulator;

an adjustable gas flow control valve, located in said gas supply line between said pressure regulator and said material conveying pipe, for regulating a volume of the gas supplied to said material conveying pipe, wherein said pressure regulator is set to maintain a pressure of the gas supplied to said adjustable gas flow control valve at a desired pressure, wherein said adjustable gas flow control valve has an orifice through which the gas supplied to said material conveying pipe is passed and an adjustable pintle for opening and closing said orifice, wherein the volume of gas flowing through said flow control valve varies in a predetermined relationship with the positioning of said pintle; and means for adjusting the pintle relative to the orifice in a manner to vary the volume of gas flowing through said flow control valve to substantially compensate for changes in the volume of gas leaking through said rotary air lock valve, wherein said pintle is adjusted to allow a greater volume of gas to flow through said orifice when said pressure in said material conveying pipe is greater than said desired pressure and wherein said pintle is adjusted to allow a lesser volume of gas to flow through said orifice when said pressure in the material conveying pipe is less than said desired pressure.

11. The dense phase conveying system as set forth in claim 10 wherein said adjustable gas flow control valve is at least 80% efficient.

12. The dense phase conveying system as set forth in claim 11 wherein said adjustable gas flow control valve is at least 90% efficient.

13. The dense phase conveying system as set forth in claim 11 wherein said gas flow control valve includes a constricted throat passage opening into a tapered outlet section.

14. The dense phase conveying system as set forth in claim 11 wherein said gas flow control valve includes a venturi outlet.

15. A method for conveying particulate material in dense phase through a conveying pipe, said method comprising:

selecting a volume $V_C$ of gas for conveying the particulate material in said material conveying pipe;

obtaining an indication of a volume $V_L$ of gas that is lost as a result of leakage; and supplying a volume $V_R$ of gas to said material conveying pipe, wherein $V_R = V_C + V_L$.

16. The method as set forth in claim 15 further comprising:

monitoring a gas pressure in said material conveying pipe;

using the monitored gas pressure as the indication of the volume $V_L$ of gas that is lost as a result of leakage; and adjusting the volume $V_R$ of gas supplied to said material conveying pipe based upon the gas pressure that is monitored in said material conveying pipe.

17. The method as set forth in claim 16 wherein said monitoring, said using, and said adjusting steps are continuous.

* * * * *